United States Patent [19]

Hirata

[11] 4,003,092
[45] Jan. 11, 1977

[54] READING OR WRITING HEAD POSITIONING DEVICE

[75] Inventor: Osamu Hirata, Tokyo, Japan

[73] Assignee: Canon Kabushiki Kaisha, Tokyo, Japan

[22] Filed: Nov. 8, 1974

[21] Appl. No.: 522,291

[30] Foreign Application Priority Data

Nov. 15, 1973 Japan ............... 48-132640[U]

[52] U.S. Cl. .................. 360/109; 74/55; 360/129
[51] Int. Cl.² .............. G11B 74/55; G11B 360/129
[58] Field of Search ............ 360/109, 104–106, 360/128–129; 74/55–56, 53–54, 571 R, 571 L, 571 M; 235/61.11 D

[56] References Cited
UNITED STATES PATENTS

| | | | |
|---|---|---|---|
| 2,535,480 | 12/1950 | Begun | 360/109 |
| 2,912,519 | 11/1959 | Simmons | 360/109 |
| 2,986,607 | 5/1961 | Jacobs et al. | 360/109 |
| 2,997,360 | 8/1961 | Hanmer et al. | 360/109 |
| 3,034,109 | 5/1962 | Maclay | 360/128 |
| 3,091,669 | 5/1963 | Frederick et al. | 360/109 |
| 3,793,894 | 2/1974 | Greskovics | 74/55 |

*Primary Examiner*—Alfred H. Eddleman
*Attorney, Agent, or Firm*—Fitzpatrick, Cella, Harper & Scinto

[57] ABSTRACT

A device for adjusting position of a head for reading out or writing in. The device includes an eccentrically rotatable member which moves the head so as to change its position relative to a recording medium and an actuating member for eccentrically rotating the rotatable member, the actuating member being coupled to the actuating member.

9 Claims, 13 Drawing Figures

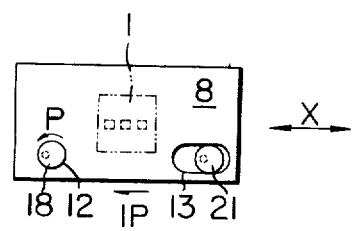
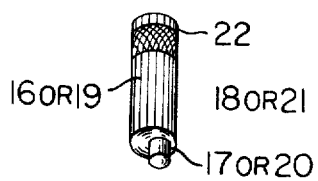
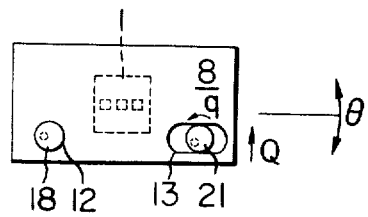
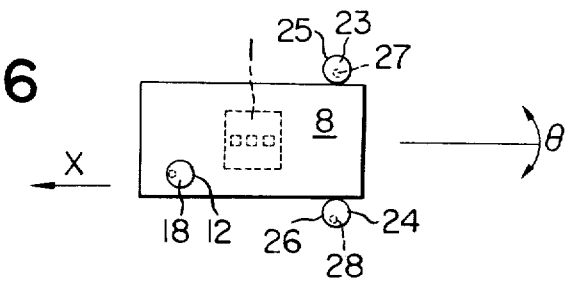
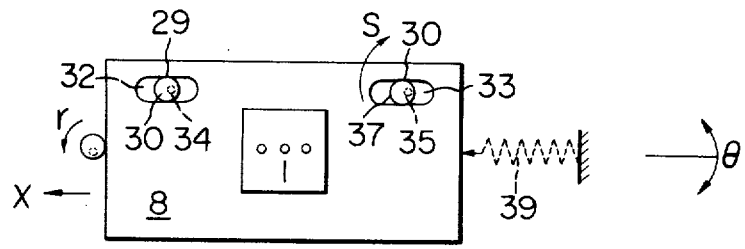
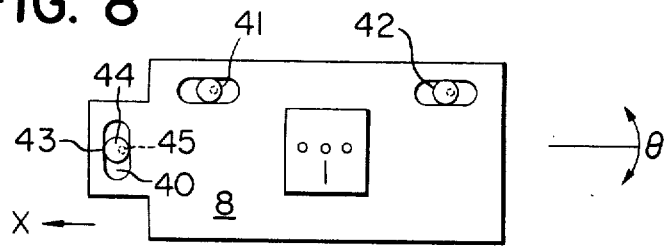
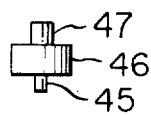
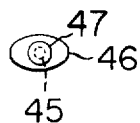

READING OR WRITING HEAD POSITIONING DEVICE

BACKGROUND OF THE INVENTION

1. Field of the Invention

This invention relates to a reading or writing head positioning device, and more particularly to a device for correctly positioning the head for reading information written on the recording medium (or for writing information on the recording medium), such as magnetic head, and the recording medium.

Generally, in a recording apparatus using a magnetic card, magnetic tape, magnetic disc or the like, as a recording medium, it is hardly possible to bring out the full capacity of the apparatus unless the apparatus and the recording medium are provided with proper interchangeability. Therefore, it is an essential requirement in such apparatus that the positional deviation between the head for reading or writing information on the recording medium and the tracks on the magnetic recording medium, such as a magnetic card, be confined within ± 20 microns while the core deviation between both ends, which has relation to squareness of the core space in the magnetic head relative to the travelling direction of the magnetic recording medium, be limited to within ± 10 microns.

2. Description of the Prior Art

In order to meet such requirement, there have been used various reading or writing head position adjusting devices. A typical example of such devices as adapted in a magnetic card reader is described hereinbelow, illustratively.

Referring to FIG. 1, there is shown a magnetic card reader adapted with a known reading or writing head positioning device. In the figure, reference numeral 1 designates a magnetic head for reading information recorded in the tracks $4_1$, $4_2$, $4_3$ on a recording strip 3 formed by applying a magnetic material on a magnetic card 2 to serve as the magnetic recording medium. Said magnetic head 1 is provided with signal output terminals $5_1$, $5_2$, $5_3$, $5_4$, $5_5$, $5_6$. Numeral 6 indicates a base provided with guide grooves $7_1$, $7_2$ for guiding the magnetic card 2. Thus, the magnetic card 2 travels in the direction of arrow $a$ along the guide grooves $7_1$, $7_2$ and the information recorded in the tracks $4_1$, $4_2$, $4_3$ are read out as they contact the magnetic head 1. Numeral 8 refers to a magnetic head supporting member secured to said base 6 by means of screws $9_1$, $9_2$, $9_3$, $9_4$. These screws $9_1$, $9_2$, $9_3$, $9_4$ can be displaced by turning them so as to adjust the positional relation of the supporting member 8 and the base 6.

According to the above-described positioning mechanism, misalignment of the magnetic head with respect to the tracks is corrected by operating the screws $9_1$, $9_2$, while the angular deviation of the magnetic head 1 from the tracks is corrected by operating the screws $9_3$, $9_4$. Such adjustment of the magnetic head position, therefore, involves troublesome operations of many screws. Particularly, it is necessary to displace the screws $9_1$ and $9_2$ and screws $9_3$ and $9_4$ equally in the longitudinal direction. This requires a great deal of skill and time.

SUMMARY OF THE INVENTION

An object of the present invention is to provide a reading or writing head positioning device which is more simple in construction than the known devices.

Another object of the present invention is to provide a reading or writing head positioning device which is capable of effecting any desired positional adjustment with far simpler operations than required in the conventional devices.

One of the salient features of the present invention is to provide a reading or writing head positioning device having a mechanism comprising a rotative member connected to means for moving the head so as to allow said member to achieve eccentric turning motion.

Other objects and features of the present invention will become apparent as the detailed description of some preferred embodiments of the invention proceeds while having reference to the accompanying drawings.

BRIEF DESCRIPTION OF THE DRAWING

FIG. 3b is a longitudinal sectional view taken along the line H—H of FIG. 3a;

FIG. 3c is a longitudinal sectional view taken along the line I—I of FIG. 3a;

FIG. 4 is a perspective view of an eccentric jig;

FIGS. 5A and 5B are schematic drawings illustrating the head positioning operations in the magnetic card reader shown in FIG. 2;

FIG. 6 is a schematic drawing shown a head positioning device according to another embodiment of the present invention;

FIG. 7 is a schematic drawing showing still another embodiment of the present invention;

FIG. 8 is a view similar to FIG. 7 but showing yet another embodiment of the present invention;

FIG. 9a is a side view of an eccentric jig provided with a cam; and

FIG. 9b is a top view of the jig shown in FIG. 9a.

DESCRIPTION OF THE PREFERRED EMBODIMENTS

The invention is now described in detail by way of its preferred embodiments with reference to the drawings.

Figure 1:
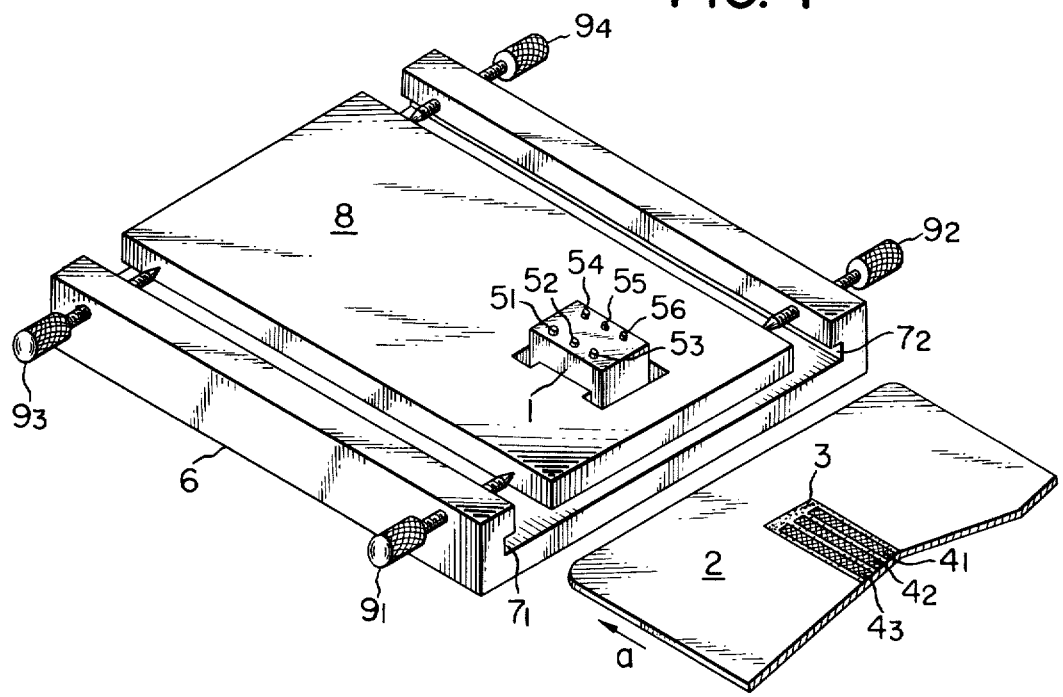
FIG. 1 is a perspective view of a magnetic card reader adapted with a known reading/writing head positioning device (hereinafter referred to as head positioning device)
Figure 2:
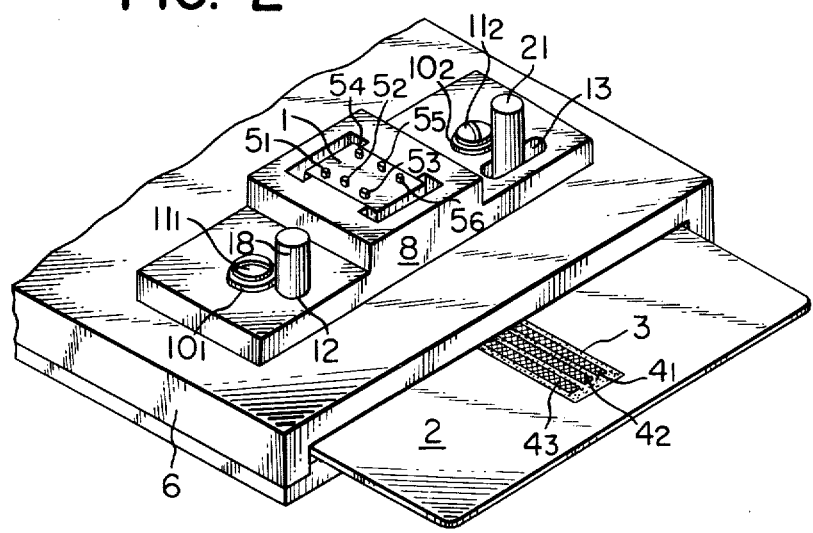
FIG. 2 is a perspective view of a magnetic card reader adapted with a head positioning device according to the present invention.
Figure 3A:
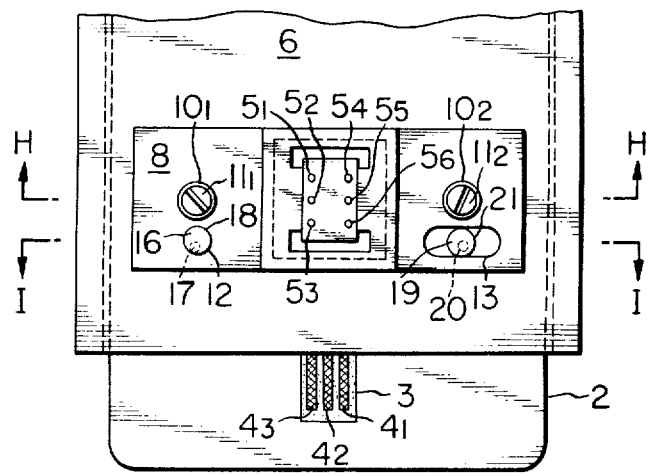
FIG. 3a is a plane view of the magnetic card reader shown in FIG. 2.
Figure 3B:
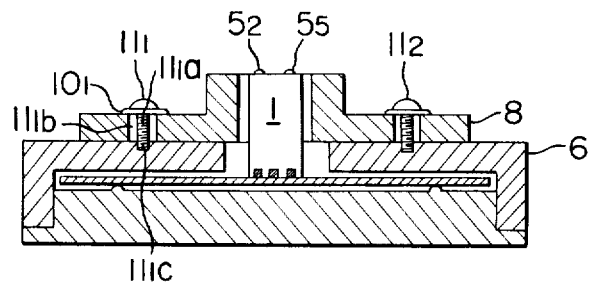
Figure 3C:
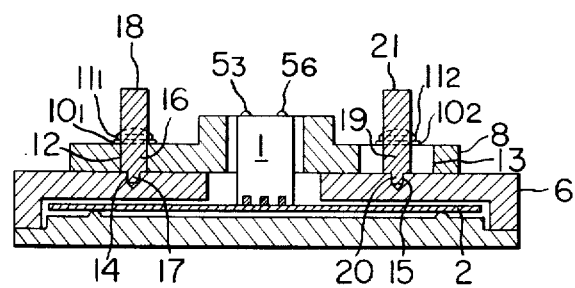

In the drawings, FIG. 2 shows in perspective a magnetic card reader incorporated with a head positioning mechanism of the present invention which eliminates the above-mentioned prior art defects. As shown in FIGS. 2 and 3a – c, the magnetic head supporting member 8 is fixed to the base 6 by means of screws $11_1$, $11_2$ with the aid of washer $10_1$, $10_2$ such that it can be adjusted in its position. As apparent from FIG. 3b showing a longitudinal section along the line H—H of FIG. 3a, the supporting member 8 is formed with a hole $11_{1b}$ larger than the outer diameter of the threaded portion $11_{1a}$ of the screw $11_1$ and the base 6 is formed with a threaded hole $11_{1c}$ for receiving and fixing therein the threaded portion $11_{1a}$ of said screw $11_1$. Thus, the supporting member 8 can be fixed to the base 6 by passing the screw $11_1$ through the hole $11_{1b}$ in the supporting member 8 via washer $10_1$ and then into the theaded hole $11_{1c}$ in the base 6. There are also formed a similar hole in the supporting member 8 and a similar threaded hole in the base 6 for the screw $11_2$ which functions similarly to said screw $11_1$. The supporting member 8 is further formed with a round hole 12 and an elongated oval hole 13, while the base 6 is formed with round holes 14 and 15 substantially in registry with said holes 12 and 13, respectively. There are also provided an eccentric jig 18 comprising a shaft 16 slidably fitting in said round hole 12 and a shaft 17 slidably fitting in said round hole 14, both shafts being joined in and an eccentric relation to each other, eccentric jig 21 comprising a shaft 19 slidably fitting in said elongated hole 13 and a shaft 20 slidably fitting in said round hole 15 and joined in eccentric relation to said shaft 19. The eccentric jigs 18 and 21 are passed through and fitted in the round holes 12 and 14 and elongated hole 13 and round hole 15, respectively. The round hole 12 is formed through the supporting member 8 so that the shaft 17, prefectly circular in sectional shape, fits therein, while the round hole 14 is formed in the base 6 so as to receive for rotation therein the end of said shaft 17. The shaft 19, which is similar to the shaft 16 in shape, is passed through the elongated slot 13 in the supporting member 8. The elongated slot 13 is so formed that its shorter diameter is equal to the outer diameter of the shaft 19, and is so designed as to allow the supporting member 8 to move only in one direction with turning movement of the eccentric jig 18. Each of said eccentric jigs 18 and 21, as shown in detail in FIG. 4, is formed by joining the shaft 17 or 20 eccentrically to the shaft 16 or 19, and the shaft 16 or 19 has a knurled or otherwise jagged portion 22 for facilitating manual turning.

The present magnetic head positioning device having the above-described arrangements is now further discussed from its operational aspect with particular reference to FIG. 5. A magnetic card 2 is inserted into the base 6 of the magnetic card reader so that said card 2 corresponds positionally to the magnetic head 1. The card 2 is introduced into the base by the operation of a power source (not shown), and the information memorized in the tracks on the card 2 are read by the magnetic head 1. For adjusting the position of the magnetic head 1, when it is not correctly positioned in relation to the magnetic card 2, the screws $11_1$ and $11_2$ fixing the supporting member 8 to the base 6 are loosened to such an extent as to allow movement of the supporting member 8 relative to the base 6.

For correcting the deviation of the magnetic head 1 from the tracks $4_1$, $4_2$, $4_3$, it is necessary to adjust the position of the head 1 in the direction of arrow X in FIG. 5a. Such adjustment can be accomplished by operating the eccentric jig 18. That is, when the eccentric jig 18 is turned in the direction of arrow P in FIG. 5a, the supporting member 8 of the head 1 is urged to move in the direction of arrow 1P owing to eccentric turning of the shaft 16 as the eccentric jig 18 turns about the shaft 17 fitting in the hole 14 in the base 6. Since the elongated slot 13 extends in the direction of arrow X, the eccentric jig 21 does not hinder movement of the supporting member 8 in the direction X. For making angular adjustment of the magnetic head 1 relative to the tracks, it needs to correct the angle of the head 1 to the direction of arrow θ in FIG. 5b, for which the eccentric jig 21 is used. That is, when the eccentric jig 21 is turned in the direction of arrow q in FIG. 5b, it turns about the shaft 20 fitting in the round hole 14 in the base 6, so that the supporting member 8 of the head 1 receives a motive force in the direction θ in the elongated slot 13 owing to the eccentric turn of the shaft 19 and is urged to turn in the direction of arrow Q about the shaft 16 of the eccentric jig 18, thus effecting a change of the angle of the magnetic head 1 relative to the tracks. During this behavior, the motive force produced by the eccentric turning of the eccentric jig 21 in the direction X won't be exerted to the supporting member 8 as the elongated slot 13 extends in the direction X.

In this way, correct magnetic head positioning in the direction transverse to the tracks can be effected by turning the eccentric jig 18 in the manner described above, while angular adjustment of the magnetic head 1 relative to the tracks can be accomplished by turning the eccentric jig 21. After making such positional adjustments of the magnetic head 1, the screws $11_1$, $11_2$ are tightened to fix the supporting member 8 at the correct position on the base 6.

Referring now to FIG. 6, there is shown in a schematic plane view a head position adjusting mechanism according to another embodiment of the present invention. In this embodiment two eccentric jigs 23 and 24 disposed in abutment on both sides of the supporting member are provided to play the role of the eccentric jig 21 in the previous embodiment. The shafts 25, 26 of said eccentric jigs 23, 24 abut against the supporting member 8, and the shafts 27, 28 extending from the lower ends of said respective shafts 25, 26 in eccentric disposition are rotatably fitted in the base 6.

In operation of the magnetic head positioning device described above, first the screws $11_1$, $11_2$ (not shown) are loosened to render the supporting member 8 movable relative to the base 6. Then the eccentric jig 18 is operated in the same way as described in the embodiment of FIG. 2 for correcting deviation of the magnetic head 1 from the tracks $4_1$, $4_2$, $4_3$.

For correcting angular deviation of the magnetic head from the tracks $4_1$, $4_2$, $4_3$, it is necessary to adjust the angle of the head 1 to the direction of arrow θ. This can be accomplished by operating the eccentric jigs 23 and 24. That is, when the eccentric jigs 23 and 24 are turned in the same direction, their respective shafts 25 and 26 turn about the shafts 27 and 28, so that the supporting member 8 is urged to turn about the eccentric jig 18 while held between the shafts 25 and 26, effecting a change in the angle θ.

As described above, adjustment of the magnetic head position in the direction perpendicular to the tracks can be accomplished by turning the eccentric jig 18 while angular adjustment of the magnetic head relative to the tracks can be effected by turning the eccentric jigs 23, 24 and after making these adjustments, the supporting member 8 is fixed to the base 6 by tightening the screws $11_1$, $11_2$.

FIG. 7 shows a head positioning device according to still another embodiment of the present invention wherein the eccentric jigs for making angular adjustment are arranged at different positions from those in the embodiment of FIG. 2. In this embodiment, angular adjustment of the magnetic head 1 relative to the tracks on the magnetic recording medium is accomplished by the eccentric jigs 29, 30 which are passed through the elongated slots 32, 33 formed in the supporting member 8, with the shorter diameter of said elongated slots being equal to the outer diameter of the shafts 30, 31 of said eccentric jigs 29, 30. Said elongated slots 32, 33 are so formed as to extend in the same direction longitudinally. At the lower ends of the shafts 30, 31 are joined the shafts 34, 35 arranged eccentric to the axes of the shafts 30, 31 said shafts 34, 35 being turnably fitted in the holes (not shown) formed in the base 6. Provided in abutment against an end of the supporting member 8 is an eccentric jig 36 adapted to allow movement of the magnetic head 1 in the direction of arrow X in FIG. 7. A shaft eccentric to the shaft 37 of said eccentric jig 36 is rotatably fitted in a hole (not shown) formed in the base 6 (not shown). At the other end of the supporting member 8 is provided a spring 39 adapted to press said supporting member in the direction of arrow.

In operation of the just described embodiment of the invention, first the supporting member 8 is rendered movable relative to the base 6 in the same manner as described above, and then the magnetic head 1 is moved in the direction of arrow X in FIG. 7 by operating the eccentric jig 36 for correcting deviation of the magnetic head 1 from the tracks. When the eccentric jig 36 is turned in the direction of arrow r in FIG. 7, said jig 36 revolves about the shaft 38 fitted in the corresponding hole in the base 6 and said shaft 38 turns such that the supporting member abuts the peripheral of the shaft 38 at the side thereof nearer to the eccentric shaft 38, so that the supporting member 8 is moved in the direction of arrow X by the pressing force of the spring 39. If the eccentric jig 36 is turned in the opposite direction, the supporting member 8 is moved in the direction opposite to the direction X. When the eccentric jig 36 is being turned, movement of the jigs 29, 30 is regulated so as to allow movement of the supporting member 8 only in the direction of arrow X.

For adjusting the angle of the magnetic head relative to the tracks, the eccentric jigs 29 and 30 are operated. When, for instance, the eccentric jig 30 is turned in the direction of arrow S in FIG. 7, said jig revolves about the shaft 35 and is moved in the direction where an elongated slots 33 abuts the shaft 37 at the side thereof near to the eccentric shaft 35, so that the supporting member 8 is urged to turn counterclockwise about the eccentric jig 29. It will be apparent from the foregoing that if the eccentric jig 29 is turned, for instance counterclockwise, the supporting member 8 is now urged to turn about the eccentric jig 30. It is to be noted that, in this embodiment, the eccentric jigs 29 and 30 are provided on the suporting member 8 in alignment with each other in the direction of arrow X so that the supporting member 8 will be allowed to move only in the direction of X with movement of the eccentric jig 34.

Referring now to FIG. 8, there is shown a head positioning device according to still another embodiment of the present invention. In this embodiment, an eccentric jig similar to FIG. 34 provided for moving the supporting member 8 in the direction X in the preceding embodiment is passed through an elongated slot 40 formed in the supporting member 8 to dispense with the spring 39 used in the preceding embodiment. It will be seen that an eccentric jig 43 adapted for moving the supporting member 8 in the direction of arrow X in FIG. 8 is passed through an elongated slot formed in the supporting member 8 in such a way as to cause no hindrance to the operation of the eccentric jigs 41, 42 (similar to those in FIG. 7) provided for turning the supporting member 8. The shorter diameter of said elongated slot 40 is equal to the diameter of the shaft 44 of the eccentric jig 43. Provided eccentric to the lower end of said shaft 44 is a shaft 45 which is revolvably fitted in a hole formed in the base (not shown).

The positional adjustment is accomplished in the same manner as in the embodiment of FIG. 7.

In the foregoing embodiments of the present invention, two shafts are joined in eccentric relation to each other and the head position is adjusted by turning such shafts, but such adjustment can be also be performed by moving the supporting member by turning a cam 46 mounted on the shaft 45 fitted in a hole formed in the base as shown in FIG. 9a by a side view and in FIG. 9b by a top view. Such cam is provided with an operating shaft 47 or groove and adjusted by a driver or other like means.

In the above-described embodiments, the eccentric jigs 18, 21 may be provided detachably from the base 6 and supporting member 8, in which case such jigs can be utilized for tightening the screws $11_1$, $11_2$ after completion of adjustment of the head position or for effecting positional adjustment of a head (such as a luminous element) for writing information on an optical recording medium. It will be apparent that the head positioning device according to the present invention can be adapted in the apparatuses where other types of magnetic sensitive elements are used as head for reading or writing information on the magnetic recording medium.

As described above, the head positioning device of the present invention is an extremely simple mechanism, low in cost and is capable of making positional adjustment of the head with ease and accuracy.

I claim:
1. A magnetic head positioning device for a recording medium reader comprising:
    a base (6) formed to receive an advancing recording medium;
    a holding member (8) mounted on said base for holding a magnetic head;
    a magnetic head (1) held by said holding member in a predetermined relationship to a path along which a recording medium may be advanced;
    first eccentric means (13, 21) rotatably mounted on said base and contacting said holding member to adjust the angle of said head relatively to the direction of advance of the recording medium; and
    second eccentric means (12, 18) including a member rotatably mounted on said base and contacting said holding member for moving said head in a direction transverse to the direction of movement of the recording medium, movement of said second eccentric means being limited in its ability to move said head by said first eccentric means.
2. A head positioning device for a recording medium reader comprising:
    a head for reading out information recorded on a recording medium;
    a holding member for holding said head;
    a base for supporting said holding member in stationary relationship to said base with said head facing the path of advancement of the recording medium, said base being formed with an opening through which said head extends to face the recording medium and means to support said holding member;
    a first adjusting member ecentrically rotatable and contacting said holding member to adjust the angle of said head relative to the direction of the advance of the recording medium, said first adjusting member being rotatably coupled to said base; and
    a second adjusting member eccentrically rotatable and contacting said holding member to effect movement of said head in a direction transverse to the direction of advance of the recording medium, said second adjusting member being rotatably coupled to said base.

3. A magnetic head positioning device for a recording medium reader comprising:
a magnetic head;
a holding member having at least one aperture for holding said magnetic head;
a base for supporting said holding member stationary relatively thereto with said head facing the path of advancement of the recording medium, said base being formed with at least two holes;
a first adjusting member eccentrically rotatable and adapted to adjust the angle of said head relative to the direction of advance of the recording medium, said first adjusting member being coupled to the first hole of said base through said aperture of said holding member;
a second adjusting member eccentrically rotatable and contacting said holding member to effect movement of said head in a direction transverse to the direction of advance of the recording medium, said second adjusting member being coupled to said second hold of said base.

4. A magnetic head positioning device according to claim 3, wherein said first adjusting member is detachably mounted on said base, and said device further includes fixing means for fixing said holding member on said base.

5. A magnetic head positioning device for a recording medium reader comprising:
a magnetic head;
a holding member having means including at least two apertures for holding said magnetic head;
a base for supporting said holding member against sliding movement thereon and to position said head to face the recording medium, said base having an opening through which said head extends, and first and second holds for supporting said holding member;
a first adjusting member eccentrically rotatable and adapted to adjust the angle of said head relative to the direction of advance of the recording medium, said first adjusting member being coupled to the first hole of said base through said aperture of said holding member;
a second adjusting member eccentrically rotatable for moving said head in a direction transverse to the direction of advance of the recording medium, said second adjusting member being coupled to the second hole of said base through the second aperture of said holding member.

6. A magnetic head positioning device according to claim 5, wherein said first adjusting member is detachably mounted on said base, and said device further includes fixing means for fixing said holding member on said base.

7. A magnetic head positioning device for a recording medium reader comprising:
a magnetic head;
a holding member having means including at least two apertures for holding said magnetic head;
a base for supporting said holding member against sliding movement thereon and to position said head to face a recording medium, said base having an opening through which said head extends, and first and second holes for supporting said holding member;
a first eccentric means including a rotatable member coupled to the first aperture of said holding member for turning said head to adjust its angle relative to the direction of movement of said recording medium;
a first supporting member eccentrically coupled to said first rotatable member and coupled to the first hole of said base and freely rotatable therein;
a second eccentric means including a rotatable member for moving said head in a direction transverse to the direction of advance of the recording medium, said second rotatable member being coupled to the second aperture of said holding member and being limited in its ability to move said head by said first eccentric means; and
a second supporting member eccentrically coupled to said second rotatable member and coupled to the second hole of said base.

8. A reading or writing head positioning device comprising:
a head for writing information on a recording medium or reading information therefrom;
a holding member having at least one aperture for holding said head;
a base for supporting said holding member being formed with an opening for reception of said head whereby said head faces the recording medium, and first and second holes to support said holding member;
first adjusting means including a member eccentrically rotatable and contacting said holding member to adjust the angle of said head relative to the direction of advance of the recording medium, said first adjusting member being rotatably coupled to said first hole of said base; and
second adjusting means including a member eccentrically rotatable for moving said head in a direction transverse to the direction of movement of the recording medium, said second adjusting member being coupled to the second hole of said base through the aperture of said holding member and being limited in its ability to move said head by said first adjusting means.

9. A reading or writing head according to claim 8, wherein said first adjusting member is detachably mounted on said base, and said device further includes fixing means for fixing said holding member on said base.

* * * * *